US006336629B1

(12) United States Patent
Carter et al.

(10) Patent No.: US 6,336,629 B1

(45) Date of Patent: Jan. 8, 2002

(54) IDLER MOUNTING TIE-BAR ASSEMBLY

(75) Inventors: Daniel L. Carter, Georgetown, KY (US); Wayne C. Powley; Alan G. Schlageter, both of Ontario, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/449,981

(22) Filed: Nov. 26, 1999

(51) Int. Cl.[7] .......................... B65H 5/02; G03G 21/00; G03G 21/16; F16C 22/00

(52) U.S. Cl. ....................... 271/274; 399/124; 399/125; 384/384; 384/218; 384/53 T; 384/581

(58) Field of Search ................................ 399/124, 125; 271/272, 273, 274; 384/535, 581, 218

(56) References Cited

U.S. PATENT DOCUMENTS 4,607,968 A * 8/1986 Carena ................ 400/637.2 X
5,028,966 A * 7/1991 Kozuka et al. ......... 355/261 X
5,120,038 A * 6/1992 Takimoto et al. ........... 271/3 X
5,265,869 A * 11/1993 Morita ....................... 271/274
5,839,032 A * 11/1998 Yasui et al. ................. 399/124

* cited by examiner

*Primary Examiner*—Christopher P. Ellis
*Assistant Examiner*—Kenneth W. Bower
(74) *Attorney, Agent, or Firm*—Oliff & Berridge, PLC

(57) ABSTRACT

A sheet transporting device assembly, such as a idler mounting assembly, of an image forming device has a frame portion attachably detachable to a guide member. The frame portion has at least one opening able to receive at least one idler roll. Each idler roll is rotatably attached to a shaft. The shaft is moveably attached to the frame by an attachment structure. The idler mounting assembly is pivotably and precisely aligned with the outer mainframe so that the components of the outer frame and the idler mounting assembly are aligned, and further allows the user to gain access the space around the guide member and between the idler rolls and drive rolls of the outer frame.

10 Claims, 2 Drawing Sheets

IDLER MOUNTING TIE-BAR ASSEMBLY

BACKGROUND OF THE INVENTION

1. Field of Invention

This invention relates to sheet transporting devices within an image forming apparatus.

2. Description of Related Art

Various systems designed for transporting a sheet in a predetermined path have a number of devices to advance the sheet along the predetermined path within an image forming apparatus. Examples of such sheet transporting devices include sheet grippers, drive rolls with idlers and sheet guides. The sheet transporting devices are fixed at various stationary locations along the predetermined path. Consequently, the stationary sheet transporting devices act on the sheet as the sheet is transported through each sheet transporting device. Some systems have multiple sheet transporting devices that move in and out of operative positions, to provide operator access.

SUMMARY OF THE INVENTION

Conventionally, previous sheet transporting devices for a particular application have been integrated into a single, unitary assembly.

One of the advantages of the idler mounting tie-bar assembly is that it locates the drive components of a sheet transporting device in precision frame assemblies that relate to one another through collinear alignment features. The idler mounting tie-bar assembly controls the relationship of the drive roll, the idler roll and the paper guides to minimize variations, which affect paper handling. Additionally the paper guide is able to attach and detach to the precision frame assembly so that the paper guide can be replaced when required.

Another advantage of the invention is that the idler mounting tie-bar assembly allows individual components, which tend to wear after use in an image forming apparatus, of the various sheet transporting devices to be replaced independently. Furthermore, the individual components may be separated and removed from the idler mounting tie-bar assembly.

Previously, if any one of the sheet transporting devices, such as a sheet guide, the baffle surface, or the like required replacing for any of a variety of reasons, it was necessary to replace the entire assembly, including those sheet transporting devices which were operating adequately. Unfortunately, replacing the entire assembly, if a single paper guide requires replacing, inefficiently discards usable materials and is unnecessarily expensive. Thus, it would be desirable to provide a sheet transporting device assembly that allows individual components of the devices to be independently and detachably mounted or combined together so that individual components of the various sheet transporting devices could be replaced without requiring replacement of the entire assembly.

One exemplary embodiment of the tie-bar idler assembly according to this invention is a tie bar idler roller assembly. This invention separately provides a tie bar idler roller assembly that allows the user to access the area in between the idler rollers and drive rollers.

The idler tie-bar assembly has a main frame portion having a plurality of grooves, protrusions, openings and bends located within the frame weldment, also referred to as the outer frame as referred to in this application. The idler tie-bar assembly further includes a plurality of openings, each of which is able to receive at least one idler roll. Each of the idler rolls are connected to the idler tie-bar assembly by at least one spring member. The movement of each of the idler rolls is limited in the corresponding opening by a slot located between the two members. The idler roller is able to move vertically along the slot portion. The spring members arc located on each end of a shaft which runs through the middle of the idler roller. The springs pull the idler roll towards the opening on the frame weldment of the idler mounting tie bar assembly with a controlled force.

The idler tie-bar assembly also has two end plates located on each end of the frame assembly that aligns the frame to a main support structure. The endplates have locating features. On a pivoting assembly, a pivot device connect the end plates to the main structure. On the opposing end of the end plates, a locking member locks the tie bar idler roller holder assembly in an operative position relative to the main structure. The pivot device allows the tie bar idler roller holder assembly to rotate with respect to the main structure to allow the tie bar idler roller holder assembly into an open position.

There are two styles of access assemblies, that usually pivot. The first pivots along the process direction, the second pivots 90 degrees to process direction. Both of these assemblies may use the same alignment principals, to maintain precision location of the components of the apparatus.

These and other features and advantages of the systems and methods of this invention are described in or are apparent from the following detailed description of the various exemplary embodiments.

BRIEF DESCRIPTION OF THE DRAWINGS

This invention will be described in relation to the following drawings, in which reference numerals refer to like elements, and wherein.

DETAILED DESCRIPTION OF PREFERRED EMBODIMENTS

Figure 1:
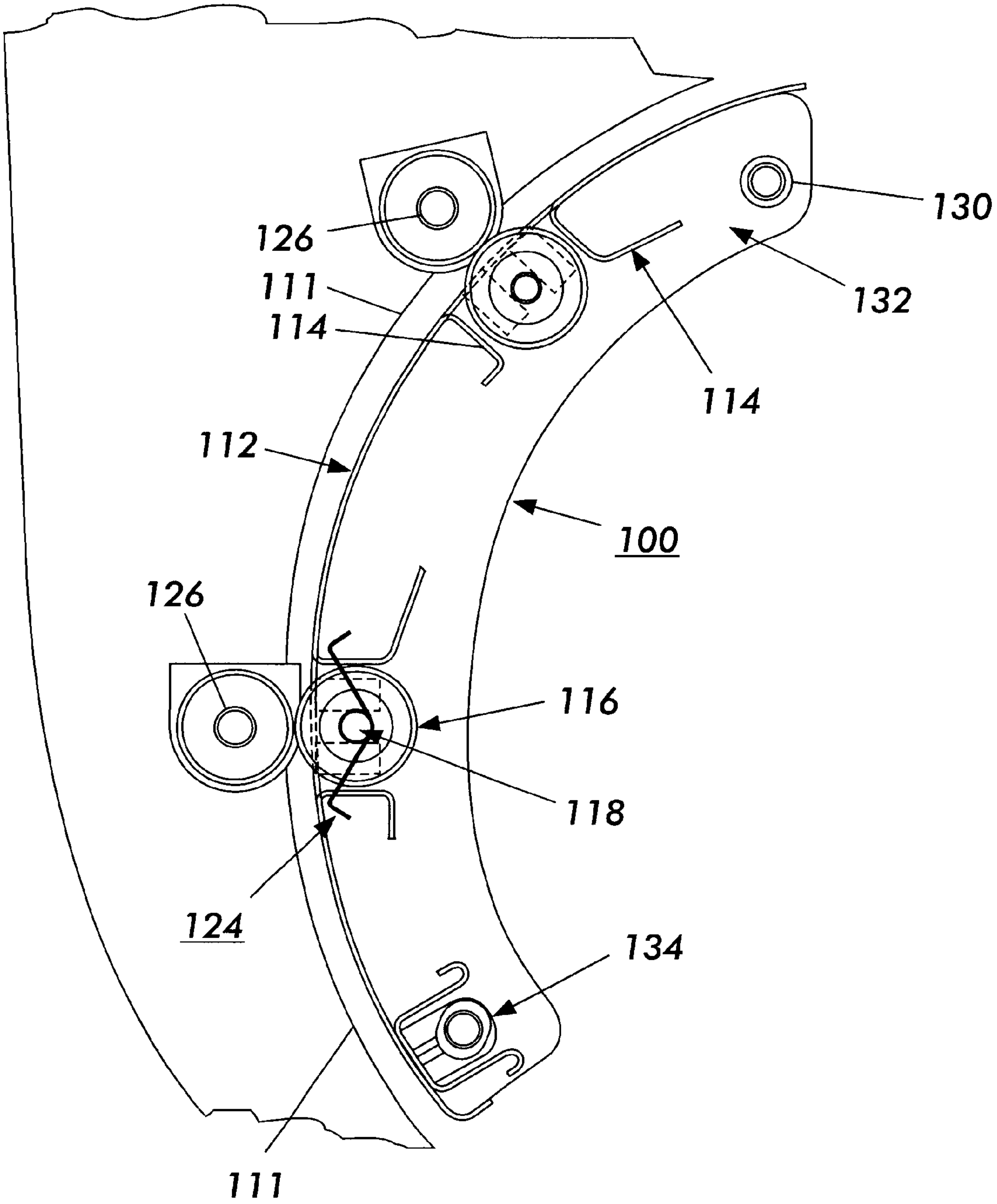
FIG. 1 is a side view of the tie bar idler roller holder assembly and the outer mainframe in a locked position and pivots in the cross process direction.
Figure 2:
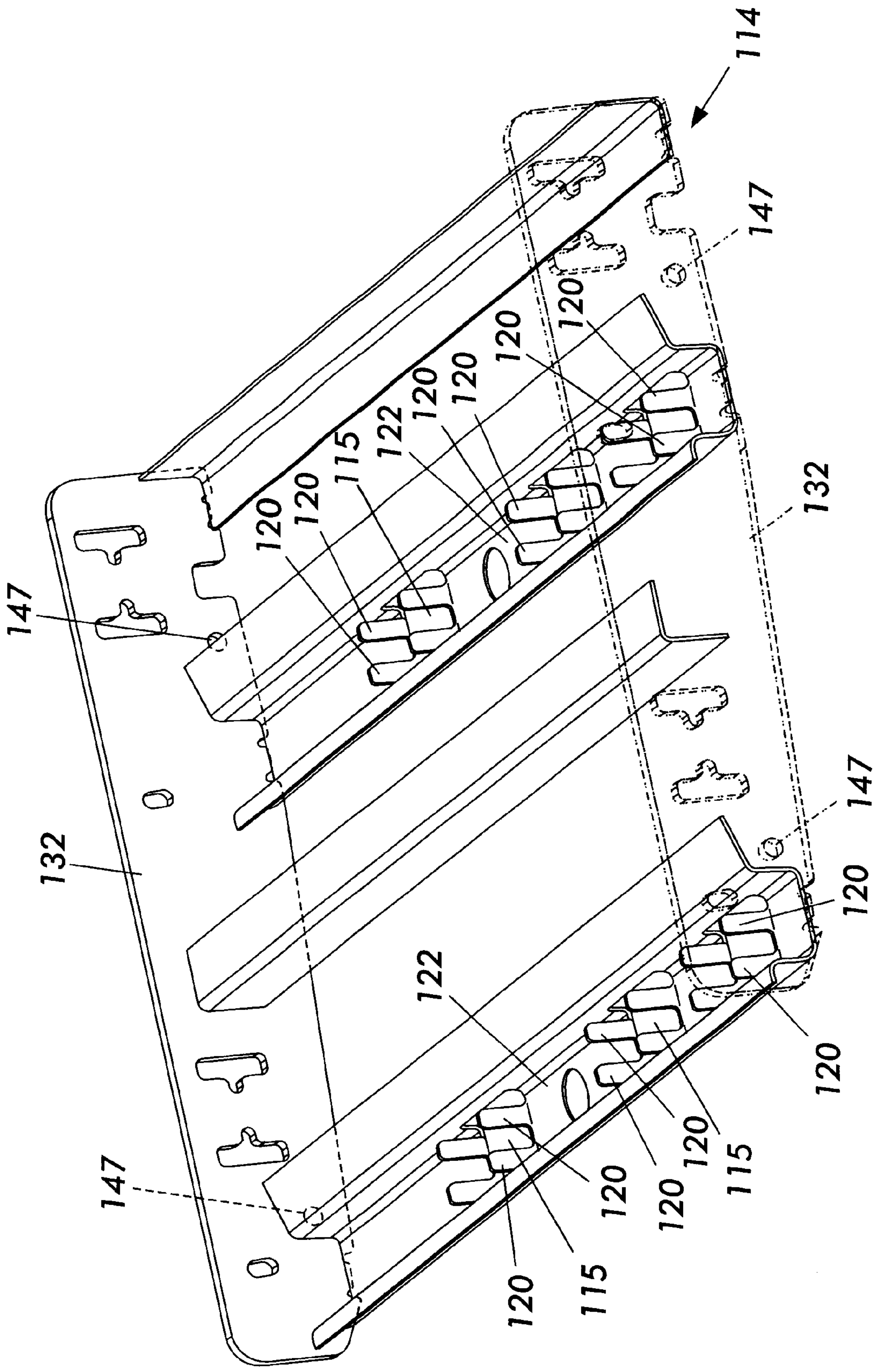
FIG. 2 is a perspective view of the tie bar idler holder frame which pivots in the process direction.

FIG. 1 shows a side-plan view of one exemplary embodiment of a idler mounting tie-bar assembly 100 in an image forming apparatus according to this invention. The idler mounting tie-bar assembly 100 is one exemplary embodiment of a sheet transporting device according to this invention. As shown in FIG. 1, the idler mounting tie-bar assembly 100 comprises a paper guide 112 , also known as a baffle, which is attached to a tie bar idler roller frame 114, as shown in FIG. 2. The tie bar idler roller frame 114 has a plurality of grooves, protrusions, and openings. The shape of the tie bar idler roller frame 114 can vary significantly depending on the user's need and the shape of the paper guide 112 which the idler mounting tie-bar frame 114 is being attached to in an image-forming apparatus. However, a description of just one possible exemplary embodiment for the idler mounting tie-bar frame 114 will be described, as shown in the figures. FIG. 1 shows the tie bar idler assembly 100 being connected to a guide member having a curved shape, whereas FIG. 2 shows the tie bar idler assembly configured in a manner which is more adapted for a guide member having a more planar shape. However, it should be appreciated that the tie bar idler assembly may be configured to correspond to any shape guide member which the user desires.

Referring to FIGS. 1 and 2, the idler mounting tie-bar frame 114 has a general rectangular shape with a plurality of openings 115 located on the idler tie-bar frame 114. Each of the openings 115 is able to receive one or more idler rolls 116. The idler rolls 116 assist in passing a recording medium (not shown) between paper guides 112 within the image forming apparatus. The idler rolls 116 are generally made from a plastic composite and, in one exemplary embodiment, have a generally cylindrical shape. The idler rolls 116 are able to receive a shaft 118 that is the axis of rotation of the idler rolls 116, as shown in FIG. 1. The idler rolls 116 are able to rotate around the shaft in either a clockwise or counterclockwise direction depending on the direction of the drive rolls 126. The drive rolls 126 are attached to or located in between a guide member 111 which is aligned with guide member 112 during operation of the image forming apparatus.

Each end of the shaft 118 is positioned between two members 120 that protrude perpendicularly from the idler tie-bar frame 114. A slot portion 122 is formed between the two members 120. The end portions of a shaft 118 are able to be received by a slot portion 122. Preferably, one pair of two members 120 is located on each side of each opening 115 in the tie bar idler roller frame 114. The slot portions 122 limit the movement of the shafts 118 to one direction and provide the precise location for aligning the idler rolls 116 and other components. Furthermore, the idler tie bar assembly 100 enables components which are related to one another, such as drive rolls 126, the idler rolls 116 and the paper guides 111 and 112, to be more precisely aligned through collinear alignment features.

As shown in FIG. 1, the idler rolls 116 and the shafts 118 are attached to the idler tie-bar frame 114 by an attachment member 124. In various exemplary embodiments, the attachment member 124 is a spring. In specific exemplary embodiments, the attachment member 124 is a torsion spring. However, the attachment member 124 can be a clip, an elastic member, or the like, or any other known or later developed attachment structure. The attachment member 124 provides the necessary normal force to push the idler rolls 116 against the drive rolls 126.

For example, in FIG. 1, the idler rolls 116 and the shafts 118 are attached to the idler tie-bar frame 114 by a plurality of the torsion springs 124. Each torsion spring 124 runs around or through an opening located on the corresponding shaft II 8 and is removably attached to the idler tie-bar frame 114. The torsion springs 124 act to pull the idler rollers 116 and the shafts 118 toward the openings 115 located on the idler tie-bar frame 114 and toward the drive rolls 126. The torsion springs 124 allow the idler rolls 116 to move within the slots portion 122. Thus, each idler roller 116 can come in contact with a corresponding drive rolls 126, but at the same time is able to move apart from the drive rolls 126. In this way, recording medium of different thicknesses and shapes may pass between through the drive rolls 126 and the idler rolls 116. Generally, each idler roller 116 corresponds to one drive roller 126. The torsion springs in particular, and the attachment member 124 in general, allow the drive rollers 126 and the idler rollers 116 to reduce the nip force variations which may occur between the drive rolls 126 and the idler rolls 116 as the recording medium pass between them. Furthermore, an elastic member (not shown) may be placed around the shaft 118 to separate the shaft 118 from the two members 120 and the idler tie bar frame 114.

The torsion spring 124 has many functions and advantages which it offers to the tie bar idler roller assembly 100. First as indicated above, the torsion spring 124 reduces the nip force variation between the idler rolls 116 and the drive rolls 126. Second, the torsion spring 124 acts as the attachment member to hold the idler rolls 116 to the tie bar idler roller frame 114. Thirdly, because each torsion spring 124 is attachably connected to the tie bar idler roller frame 114, the torsion springs 124, the idler rolls 116 and shafts 118 can easily be detached from the tie bar idler roller holder assembly 100 and be individually replaced, instead of having to replace an entire conventional sheet transporting device assembly when a problem occurs to one of the individual parts of the tie bar idler roller holder assembly 100. Furthermore, the torsion springs 124, along with the configuration of the two members 120, allow the idler rolls 116 and the drive rolls 126 to have their axes of rotation aligned. It should be appreciated that idler rolls 116 could be held in position based on the weight of the idler rolls 116 and the shaft 118, thus eliminating the need for an attachment member 124. Furthermore, if the idler rolls 116 and the drive rolls 126 are made of a very soft elastic material this would give a nip force just by interference of the idler rolls 116 and the drive rolls 126.

The tie bar idler roller frame 114 and the guide member 112 are attachably and detachably connected to each other to form the tie bar idler roller holder assembly 100. The tie bar idler roller frame 114 and the guide member 112 may be connected to each other by a screw, clamps, hooks, or any known or later developed devices able to attachably and detachably connect two components.

This is also useful because the tie bar idler roller holder assembly 100 transfers a plurality of recording mediums at high speeds. The inventors have discovered that this tends cause significant wear to the guide member 112, the idler rollers 116, the drive rollers 126 and other individual components of the tie bar idler roller holder assembly 100. Because coated media is very abrasive may cause significant wear on the sheet transporting devices, which therefore requires the components to be replaced at relatively short intervals. Therefore, the individual components of the tie bar idler roller holder assembly 100 may be replaced without having to replace the entire the tie bar idler roller holder assembly 100, as is required in conventional sheet transporting device assemblies. This allows the cost of replacing worn-out components to be significantly reduced. Therefore, the guide member 112 may be replaced without the need for replacing the idler rollers 116, the shaft 118 or the other components of the tie bar idler roller holder assembly 100.

End plates 132 are located on each end of the tie bar idler roller holder assembly 100. The end plates 132 enable the tie bar idler roller holder assembly 100 to be located accurately to an outer main frame 133. The tie bar idler roller holder assembly 100 is pivotably connected to the outer main frame 133. Each of the end plates 132 include a pivot slot 130 on one end of the end plate 132. The pivot slot 130 enables the tie bar idler roller holder assembly 100 to be attached to the outer mainframe 133. The endplates have alignment feature 147. The alignment feature 147 is able to connect to the alignment feature (not shown) of the outer main frame 133 so that all corresponding components are properly aligned to reduce the possibility of paper jamming. If the components in sheet transferring devices are not properly aligned, such as idler roll and drive roll or guide members, then this increases the likelihood of the copying media being jammed. Furthermore, if the idlers 116 and 126 are not properly aligned this reduces the gripping capability and may cause the copying media to skew.

In the exemplary embodiment shown in FIGS. 1 and 2, a locking member 134 is located on the opposite end of one of the end plates 132 from the pivot slot 130. The locking member 134 enables the tie bar idler roller holder assembly 100 to be locked into an operative position relative the outer main frame 133. It should be appreciated that the locking member 134 is positioned so that each time the tie bar idler roller holder assembly 100 is locked to the outer main frame 133, the idler rolls 116 become aligned with the drive rolls 126 and the idler and drive rolls 116 and 126 are in contact with each other.

By having the tie bar idler roller holder assembly 100 pivotably attachable to the outer main frame 133, the user has greater access to media which becomes jammed between the tie bar idler roller holder assembly 100 and the outer main frame 133. Once the user unlocks the locking member 134, the tie bar holder assembly 100 can be swung around its pivot slot 130, allowing the user access to the region between the idler rollers 116 and the drive rollers 126 and to any individual components which needs to be replaced or accessed.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A sheet transporting device in an image forming apparatus, comprising:

- a frame portion having at least one opening in the frame portion;
- a guide member attachably and detachably connected to the frame portion;
- at least one roller positioned in each at least one opening, each roller rotatably mounted on a shaft; and
- at least one wire wound torsion spring, wherein each attachment structure is moveably connecting the shaft of one of the at least one roller to the frame portion.

2. The sheet transporting device claimed in claim 1, wherein each attachment structure comprises a spring.

3. The sheet transporting device claimed in claim 1, wherein each spring comprises a torsion spring.

4. The sheet transporting device claimed in claim 1, wherein the frame further includes a set of two members located on each side of each of the at least one opening portion in the frame portion, a slot portion defined between the two members, each slot portion able to receive an end portion of the shaft of one of the at least one roller.

5. The sheet transporting device claimed in claim 1, further comprising two end plates, each end plate connected to one end of the frame portion.

6. The sheet transporting device claimed in claim 5, wherein the two end plates are pivotably connectable to a main frame in the image forming apparatus.

7. The sheet transporting device claimed in claim 6, wherein the frame is pivotable between an operative position and an access position.

8. The sheet transporting device claimed in claim 7, wherein the frame is pivoted into the access position, at least one of the guide members and at least one of the at least one roller can be detached from the frame.

9. The sheet transporting device claimed in claim 5, wherein at least one of the end plates includes at least one locking member to lock the tie bar holder assembly in an operative position relative to the image forming apparatus.

10. A sheet transporting device, comprising:

- at least one frame member;
- at least one attachment to the frame member;
- at least one powered roller rotatably mounted to the frame member; and
- at least one idler roller rotatably mounted to the attachment by a wound wire torsion spring wherein the wire wound torsion spring produces a normal force which biases the idler roller towards the powered roller.

* * * * *